United States Patent
Wu et al.

(10) Patent No.: US 7,288,462 B2
(45) Date of Patent: Oct. 30, 2007

(54) BUFFER ZONE FOR THE PREVENTION OF METAL MIGRATION

(75) Inventors: Zhonglin Wu, Bettendorf, IA (US); Scott R. Sehlin, Bettendorf, IA (US); Deno K. Georgaras, Bettendorf, IA (US)

(73) Assignee: Carleton Life Support Systems, Inc., Davenport, IA (US)

( * ) Notice: Subject to any disclaimer, the term of this patent is extended or adjusted under 35 U.S.C. 154(b) by 260 days.

(21) Appl. No.: 10/974,403

(22) Filed: Oct. 27, 2004

(65) Prior Publication Data

US 2006/0088996 A1  Apr. 27, 2006

(51) Int. Cl.
*H01L 21/76* (2006.01)

(52) U.S. Cl. .................. 438/424; 257/513; 438/404

(58) Field of Classification Search ........... 438/196, 438/207, 221, 248, 404, 424, 427; 257/374, 257/499, 501, 506, 510, 513
See application file for complete search history.

(56) References Cited

U.S. PATENT DOCUMENTS

| | | | |
|---|---|---|---|
| 3,931,496 A | 1/1976 | Hurko | |
| 5,052,103 A * | 10/1991 | Saitou | 29/852 |
| 5,278,448 A * | 1/1994 | Fujii | 257/750 |
| 5,605,560 A | 2/1997 | Ono et al. | |
| 5,972,182 A | 10/1999 | Lawless | |
| 5,985,113 A | 11/1999 | Crome et al. | |
| 6,194,335 B1 * | 2/2001 | Crome et al. | 501/103 |
| 6,329,701 B1 * | 12/2001 | Ngo et al. | 257/622 |
| 6,359,328 B1 * | 3/2002 | Dubin | 257/622 |
| 6,521,532 B1 | 2/2003 | Cunningham | |
| 6,544,397 B2 | 4/2003 | Redline et al. | |
| 6,794,335 B2 * | 9/2004 | Landes et al. | 504/128 |
| 6,822,437 B1 * | 11/2004 | Hau-Riege et al. | 324/158.1 |
| 2003/0089996 A1 | 5/2003 | Hau-Riege | |
| 2003/0226121 A1 | 12/2003 | Yokogawa | |

OTHER PUBLICATIONS

Chaitin, Saul W. et al. "Silver Migration and Printed Wiring," "Industrial and Engineering Chemistry", vol. 51, No. 3, (Mar. 1959), pp. 299-304.

Licari, James J. et al. "Hybrid Microcircuit Technology Handbook Materials, Processes, Design, Testing and Production," (N. J., "Noyes Publications", 1988) pp. 102-106.

* cited by examiner

*Primary Examiner*—S. V. Clark
(74) *Attorney, Agent, or Firm*—Jaeckle Fleischmann & Mugel, LLP

(57) ABSTRACT

Particle migration, such as silver electro-migration, on a flat ceramic surface is effectively eliminated by an upward vertical barrier formed on the surface or a groove formed in the surface between two silver conductors.

23 Claims, 3 Drawing Sheets

BUFFER ZONE FOR THE PREVENTION OF METAL MIGRATION

TECHNICAL FIELD

The present invention relates to preventing metal migration, and more particularly, to preventing silver migration across a surface.

BACKGROUND OF THE INVENTION

Metallic electro-migration has long been recognized as a significant failure mode in many electrical and electronic systems. It is widely believed that there are two types of electro-migration: electrolytic and solid state. The solid-state electro-migration is electron momentum transfer by nature, while the electrolytic electro-migration transfer is ionic, e.g., the metal is transferred in its ionic form.

Certain oxygen generators and fuel cells are electrochemical devices, examples of which are shown in U.S. Pat. Nos. 5,985,113; 5,871,624 and 6,194,335. These three patents are incorporated herein by reference. Oxygen generators of this type are used in some Integrated Manifold and Tube (IMAT) modules. The IMAT module has emerged as an attractive configuration for electrically driven oxygen separation due largely to the ability to make numerous series electrical connections while minimizing the number of large-area seals. These series connections include a bare region of ceramic electrolyte material separating two conductive regions at different electrical potentials.

IMAT modules are moving toward the direction of lower operation temperature, compared to traditional operation temperatures around 1000° C. One of the advantages of operating at 750° C. or lower is enabling use of silver in electrode and/or current collector instead other noble metals such as platinum. Thus the cost of these systems can be significantly reduced. However, as one of the most conductive metals, silver is also particularly susceptible to electro-migration. To date, experiments of silver migration on solid-state electrochemical devices have pointed toward electrolytic migration.

Silver electro-migration is enough of a problem that the life of IMAT for oxygen generation is limited because of reduced oxygen flow rate due to silver migration. Migration of the silver eventually produces failures by shorting across the inter-conductor spacing.

It is a principal object of the present invention to prevent shorts between silver conductors caused by electro-migration.

SUMMARY OF THE INVENTION

Briefly described, in a first embodiment in which silver migration is effectively prevented by a groove formed in a surface between two spaced apart conductors located on the surface wherein at least one of the conductors contains silver.

Also described is a second embodiment in which silver migration is effectively prevented by a ridge formed on a surface between two spaced apart conductors located on the surface wherein at least one of the conductors contains silver.

BRIEF DESCRIPTION OF THE DRAWINGS

The above-mentioned and other features and advantages of this invention, and the manner of attaining them, will become appreciated and be more readily understood by reference to the following detailed description in conjunction with the accompanying drawings, wherein.

Figure 1:
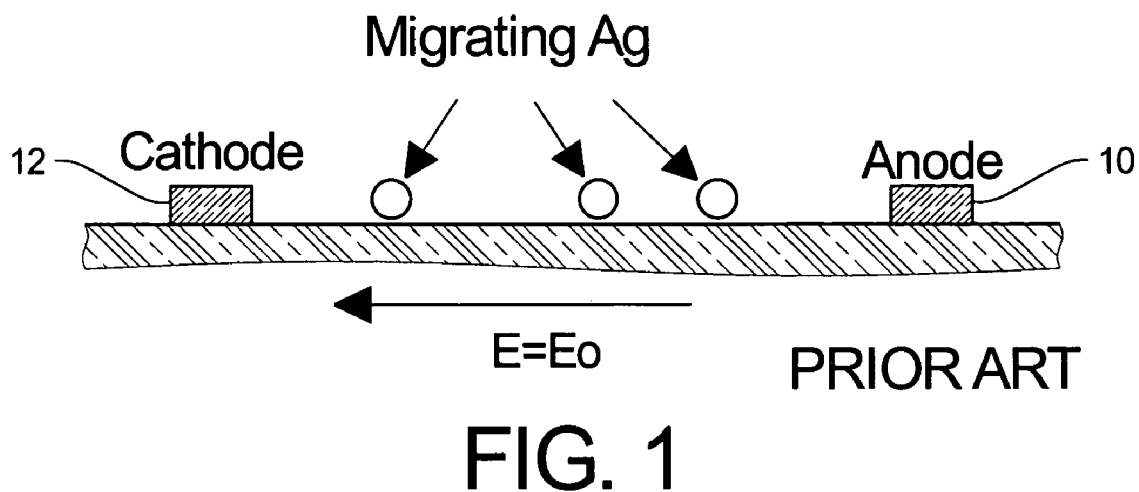
FIG. 1 is a cross-sectional view of a two conductors on a ceramic surface.

It will be appreciated that for purposes of clarity and where deemed appropriate, reference numerals have been repeated in the figures to indicate corresponding features, and that the various elements in the drawings have not necessarily been drawn to scale in order to better show the features of the invention.

DESCRIPTION OF THE PREFERRED EMBODIMENT

Referring to FIG. 1, a cross sectional view of two conductors, 10 and 12, on a ceramic surface 14 is shown. (The circles representing silver ions are, of course, not drawn to scale.) Assuming conductor 10 is positive with respect to conductor 12, silver ions will migrate from conductor 10 to conductor 12, eventually forming a short between the two conductors.

Figure 2:
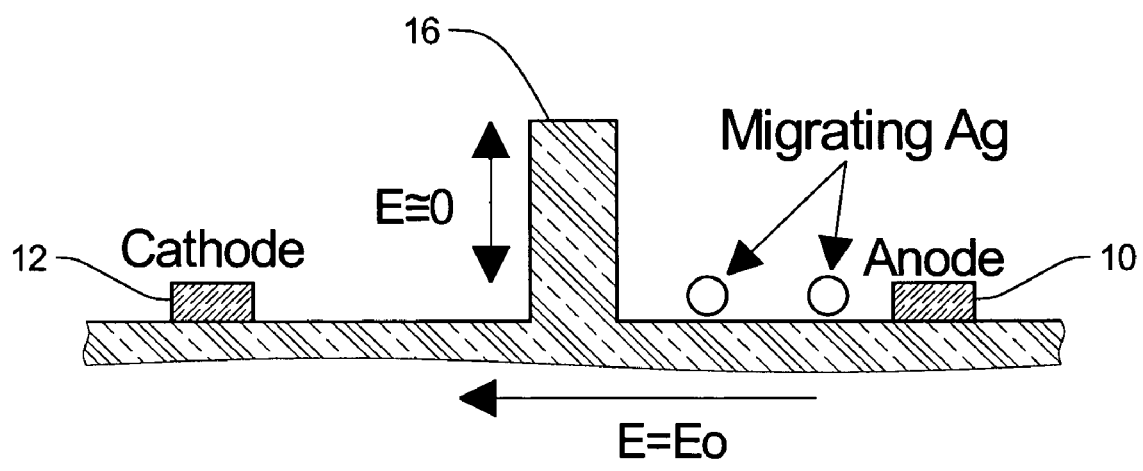
FIG. 2 is the cross-sectional view of FIG. 1 with a ridge between the two conductors.
Figure 3:
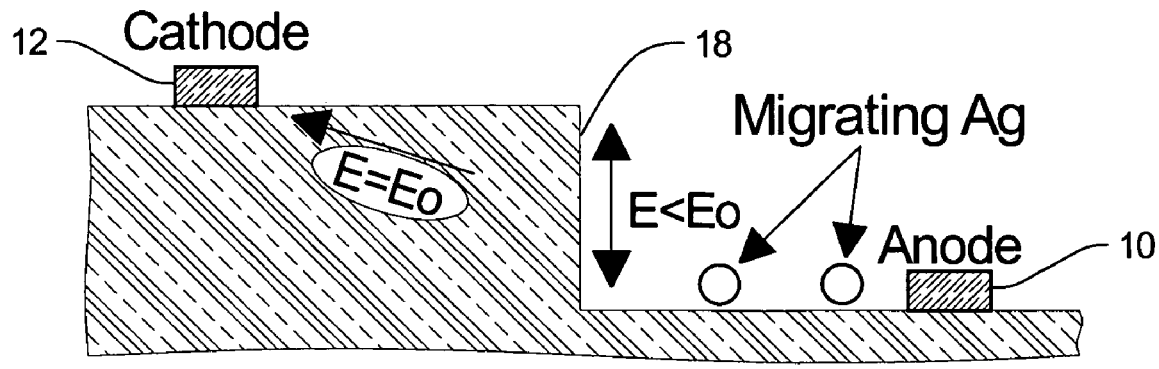
FIG. 3 is the cross-sectional view of FIG. 1 with a step between the two conductors.
Figure 4:
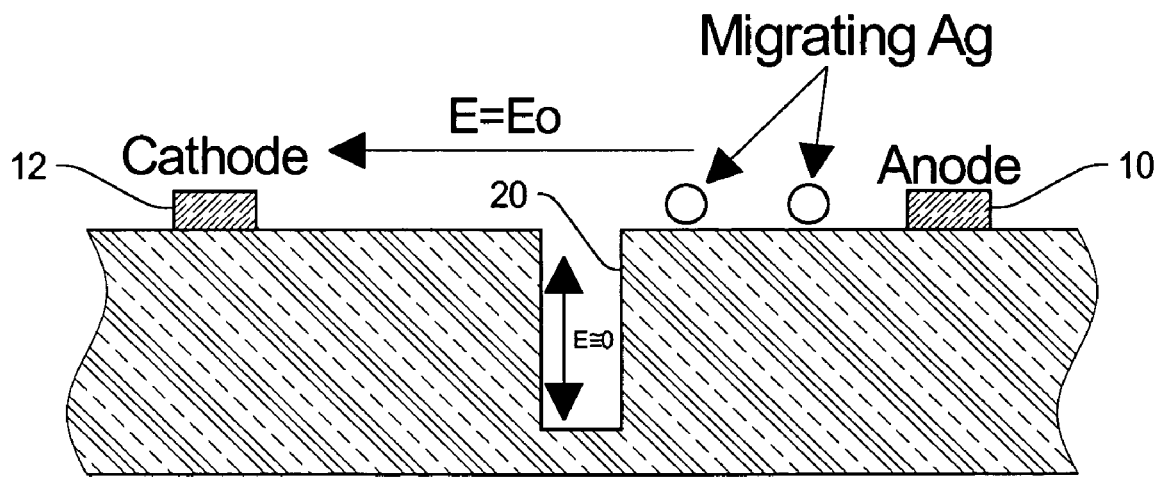
FIG. 4 is the cross-sectional view of FIG. 1 with a groove between the two conductors.

FIG. 2 is the cross-sectional view of FIG. 1 with a vertical barrier or ridge 16 between the two conductors, FIG. 3 is the cross-sectional view with a step 18 between the two conductors, and FIG. 4 is the cross-sectional view of FIG. 1 with a groove 20 between the two conductors 10 and 12. The ridge 16, the step 18, and groove 20 form buffer zones which prevent silver from migrating across the inter-conductor spacing and causing shorts between the two conductors 10 and 12. Silver electrolytic migration is driven by the electrical field between the two conductors 10 and 12. The ridge 16 and the groove 20 create a zone in the ceramic surface between the two conductors 10 and 12 with a zero or a near zero electrical field so the silver migration rate is zero or near zero inside this zone. The step 18 forms a zone in which the electric field between the two conductors 10 and 12 is reduced sufficiently to effectively prevent shorts between the two conductors 10 and 12.

Preferably these barriers 16 and 20 have at least one wall perpendicular or near perpendicular (<2°) to the electric field direction. Since the electric field along these walls is zero or near zero, silver ions will not be able to, or will be very unlikely to, move along these walls. The ridge or groove is therefore a buffer zone that prevents silver from migration from anode to cathode.

Angles greater than 2° may be used depending on the other factors related to metal migration such as the type of metal, the voltage differential between the two conductors 10 and 12, the width of the gap between the two conductors 10 and 12 and the depth of groove 20 or the height of the step 18 or the ridge 16. In the preferred embodiment the depth of the groove 20 is in the range of 0.040 to 0.050 inches, the voltage differential is between 0.5 volts and 1 volt, and the narrowest gap between the two conductors 10 and 12 is about 0.050 inches.

The groove 20 is formed during the ceramic molding operation in the preferred embodiment, and the walls of the grooves 20 are slanted such that walls are about 1° from being perpendicular to the surface 14 so that the ceramic part will release from the mold. Instead of forming the groove 20 during the molding process, the groove 20 can also be mechanically cut in the surface 14 after the part is molded. The bottom of the groove 20 and the top of the ridge 16 and step 18 do not have to be any particular shape as long as the side walls are substantially flat for the prescribed depth of the groove 20 or height of the ridge 16 and the step 18.

Figure 5A:
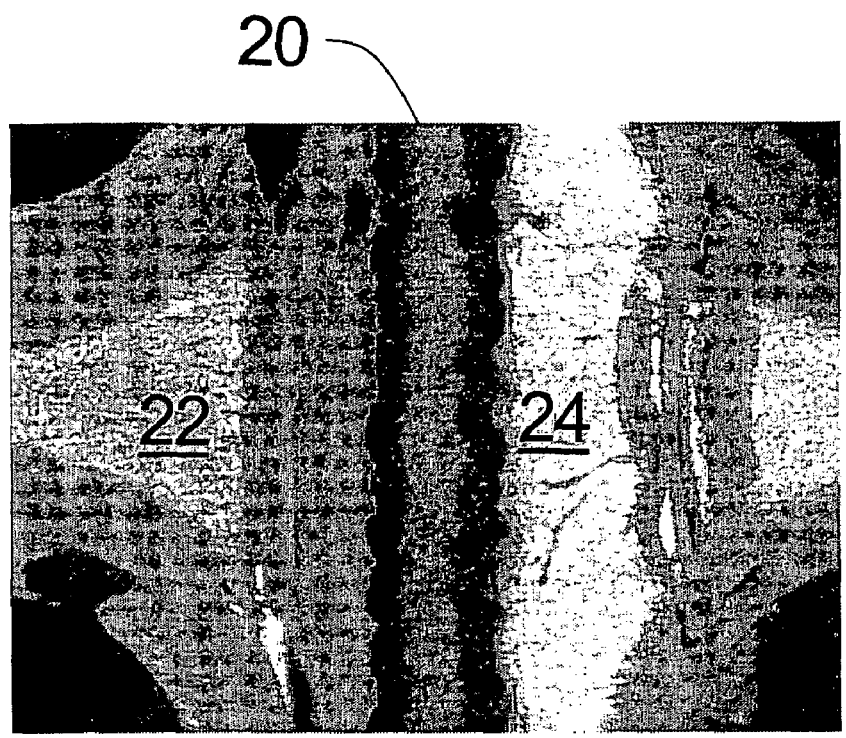
FIG. 5a is a photograph of a portion of an IMAT part showing two silver conductors formed on a ceria-based electrolyte with a groove formed therein.
Figure 5B:
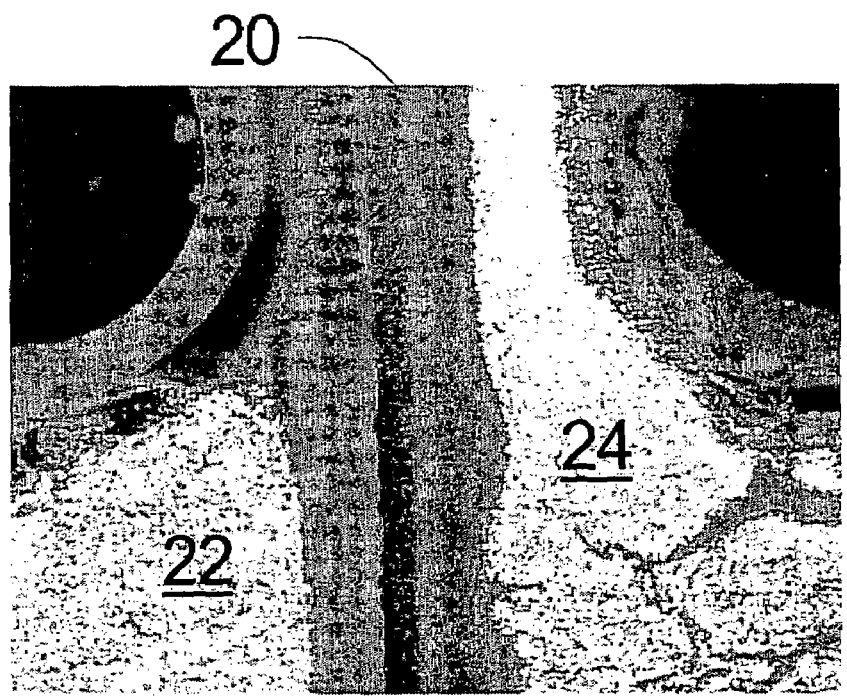
FIG. 5b is another portion of the IMAT part of FIG. 4a after it has been subjected to powered heat treatment.

FIGS. 5a and 5b are photographs of two different portions of an IMAT part showing two silver conductors formed on a ceria-based electrolyte with a groove formed therein before and after electrically powered heat treatment. Nine grooves were machined on the green part and subsequently sintered. Silver stripes 22 and 24, corresponding to the two conductors 10 and 12 shown in FIG. 1, were laid down at both sides of the grooves. The groove 20 is one of the nine grooves formed in the electrolyte. The grooves were approximately 0.046 inches wide and 0.040 inches deep. An electric voltage of 8V was applied across the conductors 22 and 24 for 456 hours at 650° C. There was no sign of silver deposition in groove 20 after testing, nor were there signs of silver in any of the other grooves. The same results were found when the ridge 16 instead of the groove 20 was used as the barrier. Also, the same results were found when the groove 20 width was reduced to 0.030 inches.

The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A method of retarding electromigration across an insulating surface separating first and second conductors disposed adjacent to said surface, the method comprising the step of forming one of a step, groove, and ridge in or on said surface between said conductors;
   wherein said step, groove, or ridge forms a buffer zone that retards electromigration across said surface.

2. A method of preventing particle migration across a substantially flat surface having first and second conductors disposed thereon wherein at least one of said conductors comprises particles that tend to migrate in the presence of an electric field, the method comprising the step of forming a groove in said surface between said conductors;
   wherein said groove forms a buffer zone that retards particle migration across said surface.

3. The method of claim 2 wherein said step of forming said groove includes forming said groove with a depth greater than 0.030 inches.

4. The method of claim 2 wherein said step of forming said groove includes forming a portion of at least one side wall of said groove that is within 2 degrees of being perpendicular to the strongest electric field across said portion which would be formed when said first and second conductors are at different electrical potentials.

5. An apparatus comprising:
   a) a insulating surface having two spaced apart conductors located on said surface, wherein at least one of the conductors comprises particles that tend to migrate in the presence of an electric field; and
   b) a groove in said surface between said conductors that forms a buffer zone, whereby shorts caused by migrating particles between said conductors are substantially eliminated.

6. The apparatus of claim 5 wherein said groove is greater than 0.030 inches deep.

7. The apparatus of claim 5 wherein said two conductors are greater than approximately 0.050 inches apart.

8. The apparatus of claim 5 wherein said groove has a portion of at least one side wall that is within 2 degrees of being perpendicular to the strongest electric field across said portion which would be formed when said first and second conductors are at different electrical potentials.

9. A method of preventing particle migration across a substantially flat insulating surface having first and second conductors disposed thereon wherein at least one of said conductors comprises particles that tend to migrate in the presence of an electric field, the method comprising the step of forming a ridge that provides a buffer zone on said surface between said conductors.

10. The method of claim 9 wherein said step of forming said ridge includes forming said ridge with a height greater than 0.030 inches.

11. The method of claim 9 wherein said step of forming said ridge includes forming a portion of at least one side wall of said ridge that is within 2 degrees of being perpendicular to the strongest electric field across said portion which would be formed when said first and second conductors are at different electrical potentials.

12. An apparatus comprising:
   a) an insulating surface having two spaced apart conductors located on said surface, wherein at least one of the conductors comprises particles that tend to migrate in the presence of an electric field; and
   b) a ridge that provides a buffer zone on said surface between said conductors whereby shorts caused by migrating particles between said conductors are substantially eliminated.

13. The apparatus of claim 12 wherein said ridge is greater than 0.030 inches high.

14. The apparatus of claim 12 wherein said two conductors are greater than approximately 0.050 inches apart.

15. The apparatus of claim 12 wherein said ridge has a portion of at least one side wall that is within 2 degrees of being perpendicular to the strongest electric field across said portion which would be formed when said first and second conductors are at different electrical potentials.

16. The apparatus of claim 6, wherein the at least one of the conductors comprising particles that tend to migrate in the presence of an electric field comprises silver.

17. The apparatus of claim 12, wherein the at least one of the conductors comprising particles that tend to migrate in the presence of an electric field comprises silver.

18. The method of claim 2, wherein the particles that tend to migrate in the presence of an electric field comprise silver particles.

19. The method of claim 9, wherein the particles that tend to migrate in the presence of an electric field comprise silver particles.

20. A method of retarding electromigration of particles that tend to move in the direction of an electric field and are present in at least one of spaced apart first and second conductors that are attached to a substantially flat insulating surface, said method comprising:

forming in or on said insulating surface a barrier zone between said first and second conductors, said barrier zone comprising a surface substantially perpendicular to the direction of an electric field formed by a predetermined voltage potential between said two conductors, wherein the strength of said electric field is substantially reduced, thereby retarding the movement of said particles between said conductors.

21. The method of claim 20, wherein said barrier zone comprises a ridge.

22. The method of claim 20, wherein said barrier zone comprises a groove.

23. The method of claim 1, wherein at least one of said conductors comprises silver.

* * * * *